United States Patent
Heo et al.

(10) Patent No.: US 12,122,217 B2
(45) Date of Patent: Oct. 22, 2024

(54) METHOD AND DEVICE FOR REDUCING A TEMPERATURE INSIDE A VEHICLE

(71) Applicants: HYUNDAI MOTOR COMPANY, Seoul (KR); KIA CORPORATION, Seoul (KR)

(72) Inventors: Jae Won Heo, Seoul (KR); Juho Choi, Hwaseong-si (KR); Sangki Seo, Suwon-si (KR); Kwang Woon Cho, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 510 days.

(21) Appl. No.: 17/384,256

(22) Filed: Jul. 23, 2021

(65) Prior Publication Data
US 2022/0185066 A1 Jun. 16, 2022

(30) Foreign Application Priority Data
Dec. 10, 2020 (KR) .......................... 10-2020-0172012

(51) Int. Cl.
*B60H 1/00* (2006.01)
(52) U.S. Cl.
CPC ..... *B60H 1/00828* (2013.01); *B60H 1/00764* (2013.01); *B60H 1/00771* (2013.01)
(58) Field of Classification Search
CPC ............ B60H 1/00828; B60H 1/00764; B60H 1/00771; B60H 1/248; B60H 1/00807; B60H 1/00778; B60H 1/00735; B60R 16/03
See application file for complete search history.

(56) References Cited

U.S. PATENT DOCUMENTS

| | | | | |
|---|---|---|---|---|
| 2015/0273975 A1* | 10/2015 | Kim | ....................... | B60H 1/248 454/139 |
| 2018/0009290 A1* | 1/2018 | Inui | ........................ | F25B 47/006 |
| 2018/0029442 A1* | 2/2018 | Inui | .................... | G05D 23/1919 |
| 2020/0031195 A1* | 1/2020 | Woods | ............... | B60H 1/00771 |

(Continued)

FOREIGN PATENT DOCUMENTS

| | | | |
|---|---|---|---|
| JP | 2015178348 A | * | 10/2015 |
| JP | 2019205965 A | | 12/2019 |

(Continued)

OTHER PUBLICATIONS

Machine Translation JP 2015178348 (Year: 2008).*
Machine Translation JP-2015178348-A (Year:2018).*

*Primary Examiner* — Anne Marie Antonucci
*Assistant Examiner* — Lidia Kwiatkowska
(74) *Attorney, Agent, or Firm* — Lempia Summerfield Katz LLC

(57) ABSTRACT

A method of reducing a temperature inside a vehicle includes: when a current time is the same as a setting time of a vehicle after the vehicle is turned off, measuring, by a controller, a temperature outside the vehicle based on an output signal of an outside air temperature sensor of the vehicle; and discharging, by the controller, air inside the vehicle to the outside of the vehicle by receiving power from a battery of the vehicle and operating a blower motor, which drives a blower, based on an operation time of the blower motor according to the temperature outside the vehicle.

12 Claims, 3 Drawing Sheets

(56) References Cited

U.S. PATENT DOCUMENTS

2020/0130466 A1* 4/2020 Imaizumi ........... B60H 1/00849
2020/0376927 A1* 12/2020 Rajaie ................ B60H 1/00764

FOREIGN PATENT DOCUMENTS

| KR | 100872448 B1 | 12/2008 |
| KR | 20120062443 A | 6/2012 |
| KR | 101866520 B1 | 6/2018 |

* cited by examiner

FIG. 3

| Outside air temperature (℃) | -10 | 0 | 5 | 10 | 15 | 25 |
|---|---|---|---|---|---|---|
| Operation time (min) | 5 | 5 | 5 | 10 | 15 | 15 |

METHOD AND DEVICE FOR REDUCING A TEMPERATURE INSIDE A VEHICLE

CROSS-REFERENCE TO RELATED APPLICATION

This application claims priority to and the benefit of Korean Patent Application No. 10-2020-0172012 filed in the Korean Intellectual Property Office on Dec. 10, 2020, the entire contents of which are incorporated herein by reference.

BACKGROUND

(a) Field of the Disclosure

The present disclosure relates to an air conditioning system for a vehicle, and more particularly, to a method and a device for reducing a temperature inside a vehicle.

(b) Description of the Related Art

In a vehicle, an air conditioning system (or air conditioning device (Heating, Ventilation, and Air Conditioning (HVAC) device) is installed. The air conditioning system includes a cooling system for cooling a vehicle compartment (inside a vehicle) or a heating system for heating a vehicle compartment.

The cooling system includes a compressor, a condenser, an expansion valve, and an evaporator. The heating system includes a pump, a heat exchanger, and a heating device.

The air conditioning system is capable of maintaining a temperature inside the vehicle at an appropriate level by operating a heater or an air conditioner while introducing outside air into the vehicle or circulating inside air. The basic cooling and heating functions are included in the air conditioning system. Also, an indoor humidity control function or air volume control function through the inflow of outside air into a vehicle or blocking the inflow of outside air into the vehicle are additionally added to the air conditioning system.

The above information disclosed in this Background section is only to enhance understanding of the background of the disclosure. Therefore, the Background section may contain information that does not form the prior art that is already known in this country to a person of ordinary skill in the art.

SUMMARY

The present disclosure has been made in an effort to provide a method and a device for reducing a temperature inside a vehicle. The method and the device are capable of reducing a temperature inside a vehicle by discharging air inside the vehicle to the outside of the vehicle by using a blower when the vehicle is start-off.

An embodiment of the present disclosure provides a method of reducing a temperature inside a vehicle. The method includes: when a current time is the same as a setting time of a vehicle after the vehicle is turned off, measuring, by a controller, a temperature outside the vehicle based on an output signal of an outside air temperature sensor of the vehicle; and discharging, by the controller, air inside the vehicle to the outside of the vehicle by receiving power from a battery of the vehicle and operating a blower motor, which drives a blower, based on an operation time of the blower motor according to the temperature outside the vehicle.

The method may further include, when the vehicle is off and State Of Charge (SOC) level information of the battery is equal to or greater than a reference value, calculating, by the controller, the current time based on Global Positioning System (GPS) time information.

The controller may calculate the current time using the GPS time information and a clock signal generated by a clock signal generator included in the controller.

The method may further include receiving, by the controller, information on the setting time of the vehicle and the GPS time information from an Audio Video Navigation (AVN) device.

The method may further include receiving, by the controller, the SOC level information of the battery from a battery sensor of the vehicle.

The method may further include entering, by the controller, an air conditioning sleep mode after the operation time of the blower motor elapses.

Another embodiment of the present disclosure provides a device for reducing a temperature inside a vehicle. The device includes: a blower motor configured to receive power from a battery of a vehicle and drive a blower; and a controller configured to measure a temperature outside the vehicle based on an output signal of an outside air temperature sensor of the vehicle when a current time is the same as a setting time of the vehicle after the vehicle is turned off. The controller discharges air inside the vehicle to the outside of the vehicle by operating the blower motor based on an operation time of the blower motor according to the temperature outside the vehicle.

When the vehicle is off and SOC level information of the battery is equal to or greater than a reference value, the controller may calculate the current time based on Global Positioning System (GPS) time information.

The controller may calculate the current time using the GPS time information and a clock signal generated by a clock signal generator included in the controller.

The controller may receive information on the setting time of the vehicle and the GPS time information from an Audio Video Navigation (AVN) device.

The controller may receive the SOC level information of the battery from a battery sensor of the vehicle.

The controller may enter an air conditioning sleep mode after the operation time of the blower motor elapses.

The method and device for reducing a temperature inside the vehicle according to to the embodiment of the present disclosure may reduce a temperature inside the vehicle (temperature of a cabin of the vehicle) by discharging high-temperature air inside the vehicle to the outside of the vehicle by using the blower when the vehicle is turned off or the vehicle is parked. Accordingly, fuel efficiency of the vehicle may be improved.

BRIEF DESCRIPTION OF THE DRAWINGS

In order to help more fully understand the drawings used in the detailed description of the present disclosure, a brief description of each drawing is provided.

FIG. 3 is a table describing an operation time of a blower motor illustrated in FIG. 1 according to a temperature outside the vehicle.

DETAILED DESCRIPTION OF THE EMBODIMENTS

Figure 1:
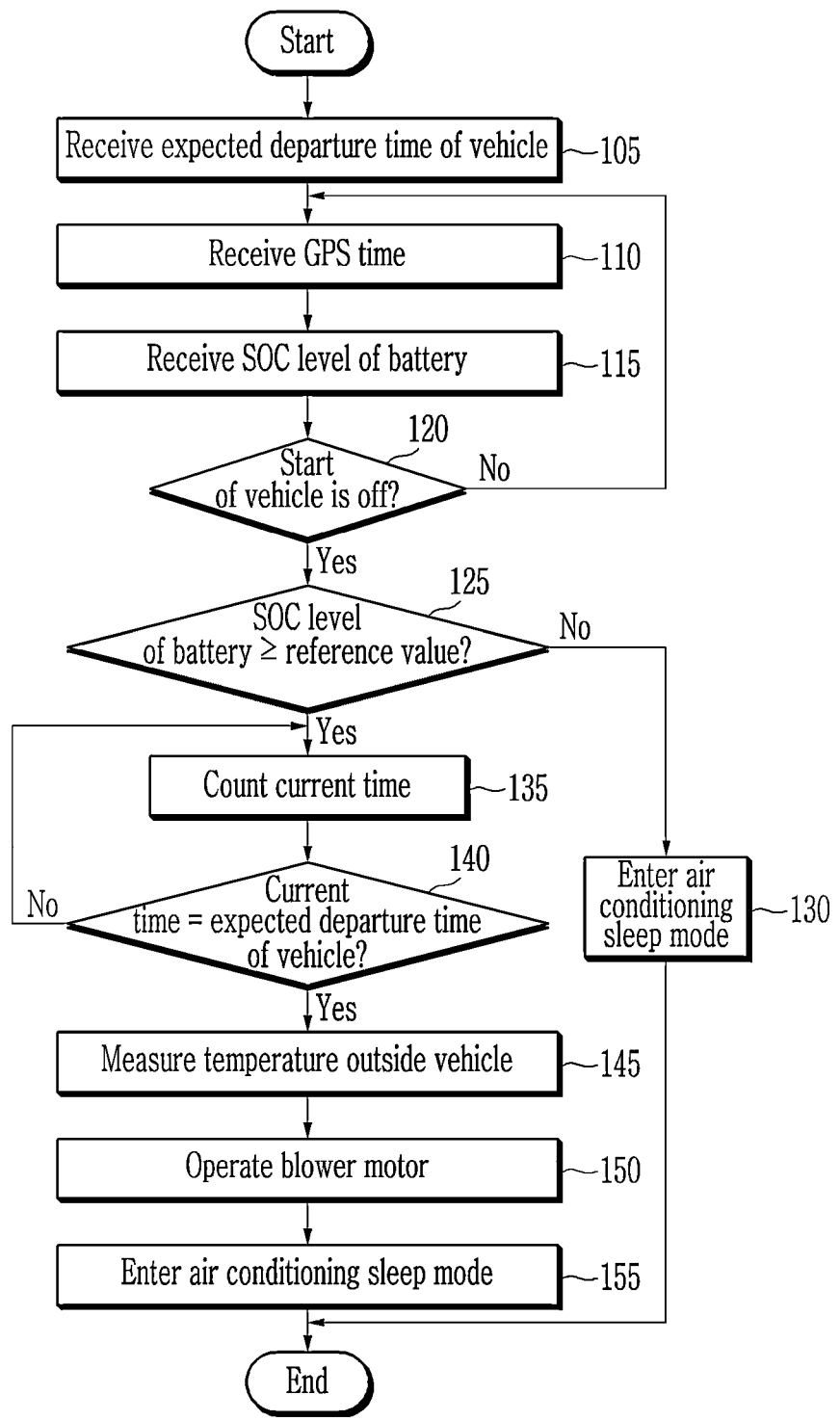
FIG. 1 is a flowchart for describing a method of reducing a temperature inside a vehicle according to an embodiment of the present disclosure.

In order to fully understand the present disclosure and the objects achieved by carrying out the present disclosure, reference should be made to the accompanying drawings illustrating embodiments of the present disclosure and the contents disclosed in the accompanying drawings.

Hereinafter, the present disclosure is described in detail by describing the embodiments of the present disclosure with reference to the accompanying drawings. In the following description of the embodiments, a detailed description of known configurations or functions incorporated herein has been omitted to avoid making the detailed description and the subject matter of the disclosure unclear. Like reference numerals presented in each drawing designate like elements throughout the specification.

The terms used in the present specification are simply used for describing specific embodiments and are not intended to limit the present disclosure. A singular expression includes a plural expression unless it is specifically described to the contrary in the context of the disclosure. In the present specification, it should be appreciated that terms "including" and "having" are intended to designate the existence of characteristics, numbers, steps, operations, constituent elements, and components described in the specification or a combination thereof. Such terms do not exclude a possibility of the existence or addition of one or more other characteristics, numbers, steps, operations, constituent elements, and components, or a combination thereof in advance.

Throughout this specification, when it is described that an element is "coupled" to another element, the element may be "directly coupled" to another element or may be connected or "electrically coupled" to another element with still another element interposed therebetween. When a component, device, element, or the like of the present disclosure is described as having a purpose or performing an operation, function, or the like, the component, device, or element should be considered herein as being "configured to" meet that purpose or to perform that operation or function.

All terms used herein including technical or scientific terms have the same meanings as meanings which are generally understood by those having ordinary skill in the art to which the present disclosure pertains unless they are differently defined herein. Terms defined in generally used dictionary should be construed to have meanings matching those in the context of a related art and should not be construed as ideal or excessively formal meanings unless they are clearly defined in the present application.

Figure 2:
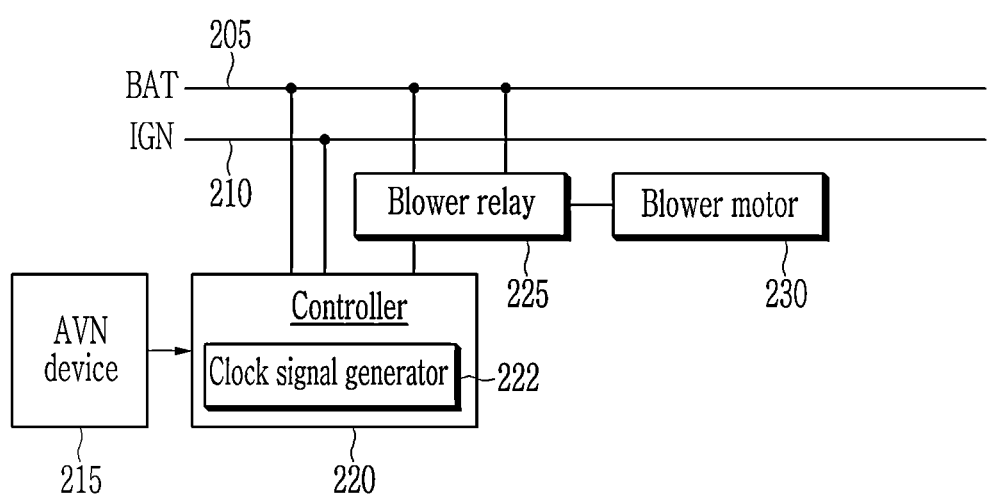
FIG. 2 is a diagram illustrating a device for reducing a temperature inside a vehicle to which the method of reducing the temperature inside the vehicle illustrated in FIG. 1 is applied.

FIG. 1 is a flowchart for describing a method of reducing a temperature inside a vehicle according to an embodiment of the present disclosure. FIG. 2 is a diagram illustrating a device for reducing a temperature inside a vehicle to which the method of reducing the temperature inside the vehicle illustrated in FIG. 1 is applied. FIG. 3 is a table describing an operation time of a blower motor illustrated in FIG. 1 according to a temperature outside the vehicle.

Referring to FIGS. 1-3, in a reception operation 105, a controller 220 may receive a setting or set time of a vehicle (for example, an expected (set) departure time of the vehicle) from an Audio Video Navigation (AVN) device 215. The expected departure time of the vehicle may be set by a user of the vehicle through a setting screen provided by the AVN device 215.

The device for reducing a temperature inside a vehicle may include the AVN device 215, the controller 220, and a blower relay 225, which supplies power of a battery of the vehicle to a blower motor 230 under the control of the controller.

The power of the battery may be supplied to the controller 220 and the blower relay 225 through a first power supply line 205. Power of a starting power source (for example, an engine ignition power source) may be supplied to the controller 220 through a second power supply line 210. The starting power source may receive power from the battery.

The AVN device 215 may include a multimedia device, which reproduces multimedia data (for example, streaming data) and a navigation device which has a Global Positioning System (GPS) receiver.

The controller 220 may be an Electronic Control Unit (ECU) and may control the general operation of the device for reducing a temperature inside a vehicle. In another embodiment of the present disclosure, the controller 220 may control an air conditioning device of the vehicle. The controller 220 may be, for example, one or more microprocessors operating by a program (control logic) or may be hardware (for example, a microcomputer) including the microprocessor. The program may include a series of instructions for performing the method of reducing a temperature inside a vehicle according to an embodiment of the present disclosure. The instruction may be stored in a memory of the device for reducing a temperature inside a vehicle or the controller 220.

According to an operation 110, the controller 220 may receive GPS time information (or GPS time) from the AVN device 215.

According to an operation 115, the controller 220 may receive a State Of Charge (SOC) level information (or an SOC level) of the battery that supplies power to the blower motor 230 of the vehicle from a battery sensor of the vehicle or from the device for reducing a temperature inside a vehicle.

According to an operation 120, the controller 220 may determine whether the vehicle is started (for example, the start of an engine of the vehicle) or is off, i.e., is not started or running. For example, the controller 220 may determine whether the vehicle is off based on a signal generated when the vehicle is off.

The method of reducing a temperature inside a vehicle, when the vehicle is off, may proceed to an operation 125. The method of reducing a temperature inside a vehicle, when the vehicle is not off, may proceed to the operation 110.

According to the operation 125, the controller 220 may determine whether the SOC level information of the battery is equal to or greater than a reference value. The reference value may be a minimum value of the SOC level of the battery that allows the blower motor 230 to be normally operated, prevents the battery from being completely discharged, and maintains (secures) durability performance of the battery. The reference value may be determined by a test (or experiment).

The method of reducing a temperature inside a vehicle, when the SOC level information of the battery is less than the reference value, may proceed to an operation 130. The method of reducing a temperature inside a vehicle, when the SOC level information of the battery is equal to or greater than the reference value, may proceed to an operation 135.

According to the operation 130, the controller 220 may enter an air conditioning sleep mode. The air conditioning sleep mode may refer to an operation mode in which the supply of the power to the controller is blocked. For example, the controller 220 may enter the air conditioning sleep mode after one hour elapses after the vehicle is turned off.

According to the operation 135, the controller 220 may count or calculate a current time based on the GPS time information. For example, the controller 220 may calculate a current time by using the GPS time information and a clock signal generated by a clock signal generator 222 included in the controller.

According to an operation 140, the controller 220 may determine whether the current time is the same as the setting time of the vehicle (for example, the expected departure time of the vehicle).

The method of reducing a temperature inside a vehicle, when the current time is the same as the expected departure time of the vehicle, may proceed to an operation 145. The method of reducing a temperature inside a vehicle, when the current time is not the same as the expected departure time of the vehicle, may proceed to the operation 135.

According to the operation 145, the controller 220 may measure a temperature outside the vehicle (or a temperature of air outside the vehicle) based on an output signal of an outside air temperature sensor included in the vehicle or the device for reducing a temperature inside a vehicle.

According to an operation 150, the controller 220 may discharge the air inside the vehicle to the outside of the vehicle through a discharge port of the vehicle by operating the blower motor, which drives the blower, based on an operating time of the blower motor 230 according to the temperature outside the vehicle. The controller 220 may ventilate the air inside the vehicle by operating the blower motor 230. The operating time of the blower motor 230 according to the temperature outside the vehicle, which is illustrated in FIG. 3, may be determined by a test (or an experiment) and may be stored in the memory.

According to an operation 155, after the operation 150, the controller 220 may enter the air conditioning sleep mode.

The constituent element, " . . . unit", a block, or a module used in the embodiment of the present disclosure may be implemented by software, such as a task, class, subroutine, process, object, execution thread, and program performed in a predetermined area of the memory, or hardware, such as Field-Programmable Gate Array (FPGA) or an Application-Specific Integrated Circuit (ASIC), and may also be implemented by a combination of the software and the hardware. The constituent element, " . . . unit" or the like may be included in a computer readable storage medium, and a part thereof may be distributed in the plurality of computers.

As described above, the embodiments have been disclosed in the drawings and the specification. The specific terms used herein are for purposes of illustration and are only used for the purpose of describing the present disclosure. Such terms are not used to limit the meaning or the scope of the present disclosure described in the claims. Accordingly, those having ordinary skill in the art should appreciate that various modifications and equivalent embodiments may be made without departing from the scope and spirit of the present disclosure. Therefore, the true technical protection scope of the present disclosure will be defined by the technical spirit of the accompanying claims.

DESCRIPTION OF SYMBOLS

215: AVN device
220: Controller
225: Blower relay
230: Blower motor

What is claimed is:

1. A method of reducing a temperature inside a vehicle, the method comprising:
   when a current time is the same as a set time that is set by a user of a vehicle after the vehicle is turned off, measuring, by a controller, a temperature outside the vehicle based on an output signal of an outside air temperature sensor of the vehicle; and
   discharging, by the controller, air inside the vehicle to the outside of the vehicle by receiving power from a battery of the vehicle and operating a blower motor, which drives a blower, for an operation time of the blower motor, the operation time determined according to the temperature outside the vehicle.

2. The method of claim 1, further comprising:
   when the vehicle is off and State Of Charge (SOC) level information of the battery is equal to or greater than a reference value, calculating, by the controller, the current time based on Global Positioning System (GPS) time information.

3. The method of claim 2, wherein:
   the controller calculates the current time using the GPS time information and a clock signal generated by a clock signal generator included in the controller.

4. The method of claim 2, further comprising:
   receiving, by the controller, information on the set time of the vehicle and the GPS time information from an Audio Video Navigation (AVN) device.

5. The method of claim 2, further comprising:
   receiving, by the controller, the SOC level information of the battery from a battery sensor of the vehicle.

6. The method of claim 2, further comprising:
   entering, by the controller, an air conditioning sleep mode after the operation time of the blower motor elapses.

7. A device for reducing a temperature inside a vehicle, the device comprising:
   a blower motor configured to receive power from a battery of a vehicle and drive a blower; and
   a controller configured to measure a temperature outside the vehicle based on an output signal of an outside air temperature sensor of the vehicle when a current time is the same as a set time that is set by a user of the vehicle after the vehicle is turned off,
   wherein the controller discharges air inside the vehicle to the outside of the vehicle by operating the blower motor for an operation time of the blower motor, the operation time determined according to the temperature outside the vehicle.

8. The device of claim 7, wherein:
   when the vehicle is off and State Of Charge (SOC) level information of the battery is equal to or greater than a reference value, the controller calculates the current time based on Global Positioning System (GPS) time information.

9. The device of claim 8, wherein:
   the controller calculates the current time using the GPS time information and a clock signal generated by a clock signal generator included in the controller.

10. The device of claim 8, wherein:
    the controller receives information on the set time of the vehicle and the GPS time information from an Audio Video Navigation (AVN) device.

11. The device of claim 8, wherein:
    the controller receives the SOC level information of the battery from a battery sensor of the vehicle.

12. The device of claim 7, wherein:
the controller enters an air conditioning sleep mode after the operation time of the blower motor elapses.

\* \* \* \* \*